US010117131B2

United States Patent
Tsai et al.

(10) Patent No.: US 10,117,131 B2
(45) Date of Patent: *Oct. 30, 2018

(54) METHOD FOR CANCELLING A DATA TRANSMISSION OF A NEIGHBORING CELL

(71) Applicant: MEDIATEK INC., Hsinchu (TW)

(72) Inventors: Lung-Sheng Tsai, Tainan (TW); Xiangyang Zhuang, Lake Zurich, IL (US)

(73) Assignee: HFI Innovation Inc., HsinChu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/431,417

(22) Filed: Feb. 13, 2017

(65) Prior Publication Data

US 2017/0156079 A1 Jun. 1, 2017

Related U.S. Application Data

(63) Continuation of application No. 14/607,361, filed on Jan. 28, 2015, now Pat. No. 9,602,229.

(Continued)

(51) Int. Cl.
*H04W 4/00* (2018.01)
*H04W 28/04* (2009.01)
(Continued)

(52) U.S. Cl.
CPC ............ *H04W 28/04* (2013.01); *H04B 15/00* (2013.01); *H04L 5/0073* (2013.01); *H04W 24/02* (2013.01);
(Continued)

(58) Field of Classification Search
CPC ....... H04L 45/02; H04L 47/122; H04L 47/18; H04W 28/0231; H04W 28/0268
(Continued)

(56) References Cited

U.S. PATENT DOCUMENTS

| 2007/0030914 A1 | 2/2007 | Ding et al. .................... 375/260 |
| 2010/0202377 A1 | 8/2010 | Nishio et al. ................. 370/329 |

(Continued)

FOREIGN PATENT DOCUMENTS

| CN | 102065434 A | 5/2011 |
| CN | 103428120 A | 5/2012 |

(Continued)

OTHER PUBLICATIONS

R4-134651 3GPP TSG-RAN WG4 Meeting #68bis; Ericsson, ST-Ericsson; Discussion on potential blind detection/estimation of parameters for NAICS; Riga, Latvia dated Aug. 7-11, 2013 (8 pages).

(Continued)

*Primary Examiner* — Chi H Pham
*Assistant Examiner* — Alexander O Boakye
(74) *Attorney, Agent, or Firm* — Imperium Patent Works; Zheng Jin

(57) ABSTRACT

A method of interference cancellation is proposed. A UE obtains configuration information of a data transmission from a neighboring cell via an interference channel in a mobile communication network. The UE receives radio signals on a set of data resource elements as determined based on the obtained configuration information. The UE then estimates the interference channel corresponding to the data transmission from the neighboring cell based on the received radio signals on the set of data resource elements. Finally, the UE cancels the data transmission from the neighboring cell based on the estimated interference channel.

6 Claims, 7 Drawing Sheets

Related U.S. Application Data

(60) Provisional application No. 61/932,827, filed on Jan. 29, 2014.

(51) Int. Cl.
  *H04W 24/02* (2009.01)
  *H04B 15/00* (2006.01)
  *H04L 5/00* (2006.01)

(52) U.S. Cl.
  CPC ......... *H04W 28/048* (2013.01); *H04L 5/0007* (2013.01)

(58) Field of Classification Search
  USPC ......................................................... 370/329
  See application file for complete search history.

(56) References Cited

U.S. PATENT DOCUMENTS

| | | | |
|---|---|---|---|
| 2012/0033646 A1 | 2/2012 | Luo et al. | 370/336 |
| 2012/0201162 A1 | 8/2012 | Kim et al. | 370/252 |
| 2012/0295610 A1 | 11/2012 | Deng et al. | 455/423 |
| 2012/0307771 A1 | 12/2012 | Yang et al. | 370/329 |
| 2013/0034072 A1 | 2/2013 | Kim et al. | 370/329 |
| 2013/0044697 A1 | 2/2013 | Yoo et al. | 370/329 |
| 2013/0077578 A1 | 3/2013 | Wang et al. | 370/329 |
| 2013/0114437 A1 | 5/2013 | Yoo et al. | 370/252 |
| 2013/0114438 A1 | 5/2013 | Bhattad et al. | 370/252 |
| 2013/0115987 A1 | 5/2013 | Yoo et al. | 455/501 |
| 2013/0235842 A1 | 9/2013 | Jia et al. | 370/330 |
| 2014/0071952 A1 | 3/2014 | Kim et al. | 370/335 |
| 2014/0098773 A1 | 4/2014 | Yoo et al. | 370/329 |
| 2014/0161103 A1 | 6/2014 | Sirotkin et al. | 370/332 |
| 2014/0301268 A1 | 10/2014 | Xu et al. | 370/312 |
| 2014/0307569 A1 | 10/2014 | Barbieri et al. | 370/252 |
| 2015/0078257 A1 | 3/2015 | Wu et al. | 370/328 |
| 2015/0223232 A1 | 8/2015 | Eriksson et al. | 370/329 |
| 2015/0264594 A1 | 9/2015 | Davydov et al. | 370/252 |
| 2017/0156080 A1* | 6/2017 | Tsai | H04W 28/048 |
| 2017/0163367 A1* | 6/2017 | Tsai | H04J 11/005 |

FOREIGN PATENT DOCUMENTS

| | | |
|---|---|---|
| CN | 103428120 A | 12/2013 |
| WO | WO2011052869 A1 | 5/2011 |
| WO | WO2011103475 A1 | 8/2011 |
| WO | WO2012161550 A2 | 11/2012 |
| WO | WO2013025943 A1 | 2/2013 |
| WO | WO2014133650 A1 | 9/2014 |

OTHER PUBLICATIONS

R4-136026 3GPP TSG-RAN WG4 Meeting #69; Huawei et al.; Introduction of CA_39A-41A to TS 36.307; San Francisco, CA, US dated Nov. 11-15, 2013 (2 pages).
R4-136900 3GPP TSG-RAN WG4 #69; Qualcomm Incorporated; NAICS Phase-2 Evaluations for Bind R-ML Receivers; San Francisco, USA dated Nov. 11-15, 2013 (10 pages).
R4-136901 3GPP TSG-RAN WG4 #69; Qualcomm Incorporated; NAICS Phase-2 Evaluations for Blind SLIC Receivers; San Francisco, USA dated Nov. 11-15, 2013 (16 pages).
R4-135486 3GPP TSG-RAN WG4 #68bis; Qualcomm Incorporated; Performance of Blind R-ML Receivers for NAICS Phase-1 Evaluations; Riga, Latvia dated Oct. 7-11, 2013 (21 pages).
R4-135490 3GPP TSG-RAN WG4 #68bis; Qualcomm Incorporated; Performance of Blind SLIC Receivers for NAICS Phase-2 evaluations; Riga, Latvia dated Oct. 7-11, 2013 (6 pages).
R4-135494 3GPP TSG-RAN WG4 #68bis; Qualcomm Incorporated; Performance of Blind R-ML Receivers for NAICS Phase-2 evaluations; Raga, Latvia dated Oct. 7-11, 2013 (5 pages).
International Search Report and Written Opinion of International Search Authority for PCT/CN2015/071845 dated Apr. 29, 2015(12 pages).
International Search Report and Written Opinion of International Search Authority for PCT/CN2015/071849 dated May 6, 2015(12 pages).
3rd Generation Partnership Project; Technical Specification Group Radio Access Network; Network-assisted Interference Cancellation and Suppression for LTE (Release 12) (Dec. 16, 2013) sections 7.4-7.6.
EPO, Search Report for the EP patent application 15743311.1 dated Jun. 7, 2016 (8 pages).
EPO, Search Report for the EP patent application 15743861.5 dated Jun. 6, 2016 (9 pages).
USPTO, Office Action for related U.S. Appl. No. 14/607,402 dated Aug. 9, 2016 (24 pages).
SIPO, search report for the CN patent application 201580001228.5 (no English translation is available) dated Mar. 30, 2018.
3GPP TR 36.866 V1.0.0 (Nov. 2013); 3rd Generation Partnership Project; Technical Specification Group radio access Network; Network-assisted Interference Cancellation and Suppression for LTE (Release 12).
R1-135884 3GPP TSG-RAN WG1 #75, MediaTek Inc., "On network signaling/coordination for NAICS and possible specification impact", San Francisco, USA, Nov. 11-15, 2013.

* cited by examiner

METHOD FOR CANCELLING A DATA TRANSMISSION OF A NEIGHBORING CELL

CROSS REFERENCE TO RELATED APPLICATIONS

This application is a continuation, and claims priority under 35 U.S.C. § 120 from nonprovisional U.S. patent application Ser. No. 14/607,361, entitled "Methods for Cancelling a Data Transmission of a Neighboring cell," filed on Jan. 28, 2015, the subject matter of which is incorporated herein by reference. Application Ser. No. 14/607,361, in turn, claims priority under 35 U.S.C. § 119 from U.S. Provisional Application No. 61/932,827, entitled "Methods for Cancelling a Data Transmission of a Neighboring Cell," filed on Jan. 29, 2014, the subject matter of which is incorporated herein by reference.

TECHNICAL FIELD

The disclosed embodiments relate generally to mobile communication networks, and, more particularly, to methods for interference cancellation of data transmission from neighboring cells.

BACKGROUND

Long Term Evolution (LTE) is an improved universal mobile telecommunication system (UMTS) that provides higher data rate, lower latency and improved system capacity. In LTE systems, an evolved universal terrestrial radio access network includes a plurality of base stations, referred as evolved Node-Bs (eNBs), communicating with a plurality of mobile stations, referred as user equipment (UE). A UE may communicate with a base station or an eNB via the downlink and uplink. The downlink (DL) refers to the communication from the base station to the UE. The uplink (UL) refers to the communication from the UE to the base station. LTE is commonly marketed as 4G LTE, and the LTE standard is developed by 3GPP.

In cellular networks, the inter-cell interference is commonly seen at a UE when a "desired" data transmission (i.e., one from the "serving cell") is interfered by an interfering data transmission from a neighboring cell to another UE that has the neighboring cell as its "serving cell". When the network deployment is synchronized among all cells with sufficient accuracy (e.g., to a GPS signal), the mobile receiver may attempt to cancel the interference in order to achieve a better throughput on the desired data transmission.

Starting from April 2013, 3GPP started a new study item (SI), "Network Assisted Interference Cancellation and Suppression" (NAICS), to investigate the benefit on system throughput by leveraging receiver's capability of interference cancelation (IC). There are many methods for interference cancellation at the receiver, but typically, they all exploit some known or estimated characteristics of the interference data transmission such as the corresponding interference channel, the modulation order of the interference symbols, the coding information to possibly reconstruct the interference signal, and so on. Compared with interference-suppression receivers, IC-receivers usually need more transmission parameters of interference.

Commonly investigated IC techniques in literature may include symbol-level based IC (SLIC) and codeword-level IC (CWIC). SLIC is an IC technique that detects interfering signal, which is supposed to be finite-constellation modulated, in a per-symbol basis. CWIC is a technique in which a receiver decodes and re-encodes an interference codeword to reconstruct the contribution of the interference signal on its received signal. Compared to SLIC, a receiver needs more information on interference to access CWIC, such as the modulation and coding scheme (MCS) index and the rule for scrambling the bit stream of interference. Obtaining the interference characteristics, such as the modulation order or encoding rules of the interfering signal, is important for all IC techniques. The characteristics could be either blindly detected by victim receiver or informed from network side.

The challenge of interference cancellation lies on the fact that data transmission can be very dynamic in a neighboring cell due to the scheduling behavior of a base station when serving multiple UEs at the same time. As a result, interference may or may not be present from time to time depending on the traffic loading; different UEs may be scheduled at different time; the frequency resources allocated to a UE in an OFDMA based system (e.g., LTE) change from time to time; the modulation order and/or coding rate change according to the dynamic channel condition; and so on.

There are study results that showed promising gain assuming known or reliable detection of some transmission parameters of the interfering data transmission. However, the so-called "blind-detection" receiver can be very complex and unreliable if it must detect or estimate all the characteristics of a possible interfering data transmission, especially when the resources allocated to a data transmission can be very dynamic in both the time and frequency dimension as in LTE. Given the significant throughput gain from interference cancellation, especially for OFDMA-based networks such as LTE, there is a need to enable robust cancellation of neighboring cell's data transmission.

SUMMARY

A method of interference cancellation is proposed. A UE obtains configuration information of a data transmission in a mobile communication network. The data transmission is transmitted from a neighboring cell to the UE via an interference channel. The UE receives radio signals on a set of data resource elements as determined based on the obtained configuration information. The UE then estimates the interference channel corresponding to the data transmission from the neighboring cell based on the received radio signals on the set of data resource elements. Finally, the UE cancels the data transmission from the neighboring cell based on the estimated interference channel.

In one embodiment, the configuration information comprises a resource allocation type of the data transmission from the neighboring cell. In another embodiment, the configuration information comprises a basic resource allocation unit of the data transmission from the neighboring cell. The UE may determine the location of the set of date resource elements from the resource allocation information and then estimate the interference channel accordingly. In one example, the UE first estimates a desired signal corresponding to a reference signal transmitted from the serving cell and then subtracts from the received signals the estimated desired signal to estimate the interference channel.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
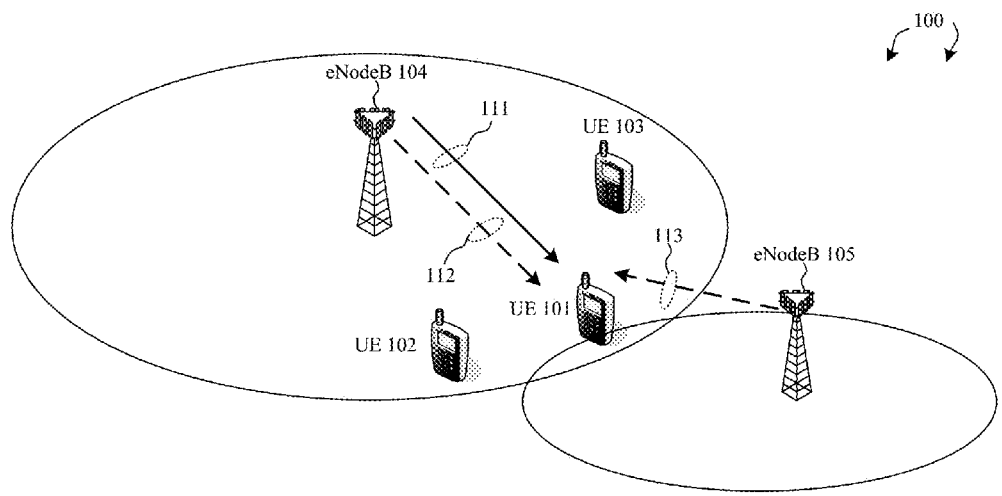
FIG. 1 illustrates a mobile communication network with interference cancellation of data transmission from neighboring cells in accordance with one novel aspect.

FIG. 1 illustrates a mobile communication network 100 with interference cancellation of data transmission from neighboring cells in accordance with one novel aspect. Mobile communication network 100 is an OFDM network comprising a plurality of user equipments UE 101, UE 102, and UE 103, a serving base station eNB 104, and a neighbor base station eNB 105. In the example of FIG. 1, UE 101 is served by its serving base station eNB 104. UE 101 receives desired radio signal 111 transmitted from eNB 104. However, UE 101 also receives interfering radio signals. In one example, UE 101 receives intra-cell interfering radio signal 112 transmitted from the same serving eNB 104. Typically, such intra-cell interference is due to multi-user multiple-input multiple-output (MU-MIMO) transmission intended for other UEs (e.g., UE 102 and UE 103) in the same serving cell. In another example, UE 101 receives inter-cell interfering radio signal 113 transmitted from neighbor base station eNB 105. UE 101 may be equipped with an interference cancellation (IC) receiver that is capable of cancelling the contribution of the interfering signals from the desired signals.

The characteristics of a data transmission in LTE downlink illustrate the dynamic nature given the resources can be allocated in both time and frequency domain. Here, a data transmission refers a data-bearing Physical Downlink Shared Channel (PDSCH) in LTE. The data carried in PDSCH is known as transport block (TB) which corresponds to a MAC-layer PDU (Protocol Data Unit). PDSCH transmission is characterized by transmission parameters in three general categories: 1) Resource allocation of PDSCH; 2) PDSCH signal structure, i.e., mapping of a TB to signal according to a transmission mode (TM); and 3) Reference signals, to allow estimation of the corresponding channel for PDSCH demodulation to decode out the TB. These characteristics of data transmission are important for reliable interference cancellation.

In accordance with one novel aspect, UE 101 receives configuration information from serving eNodeB 104 via higher layer signaling. The configuration information comprises resource allocation (RA) information, transmission mode, and other parameters related to the interfering data transmission from the neighbor eNodeB 105. UE 101 then determines a set of data resource elements from the configuration information. UE 101 then estimates the interference channel corresponding to the data transmission of the neighbor cell based on the received signal on the set of data resource elements. Finally, UE 101 cancels the data transmission from the neighboring cell based on the estimated interference channel.

Figure 2:
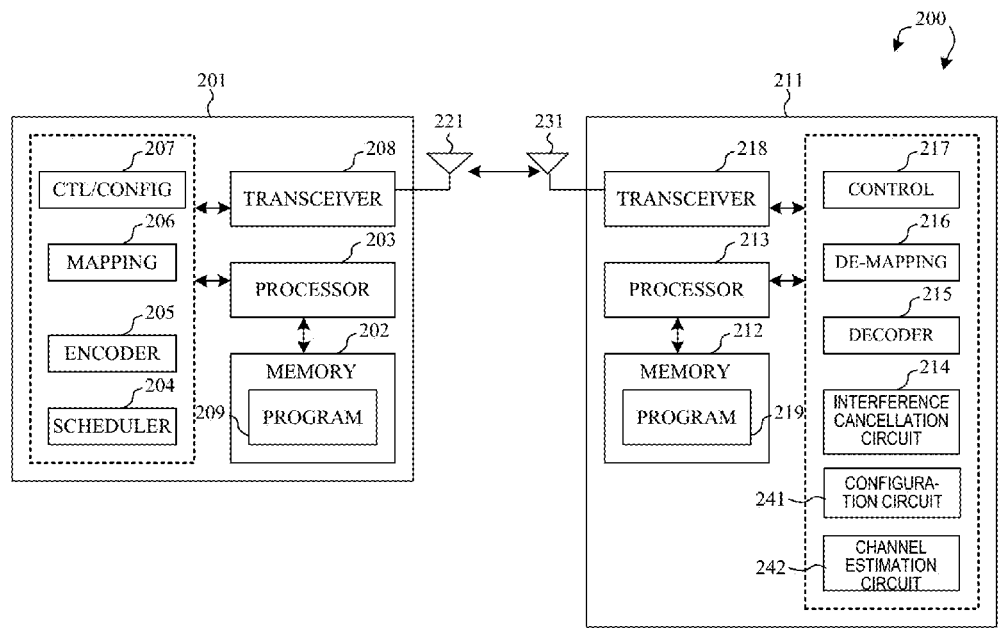
FIG. 2 is a simplified block diagram of a base station and a user equipment that carry out certain embodiments of the present invention.

FIG. 2 is a simplified block diagram of a base station 201 and a user equipment 211 that carry out certain embodiments of the present invention in a mobile communication network 200. For base station 201, antenna 221 transmits and receives radio signals. RF transceiver module 208, coupled with the antenna, receives RF signals from the antenna, converts them to baseband signals and sends them to processor 203. RF transceiver 208 also converts received baseband signals from the processor, converts them to RF signals, and sends out to antenna 221. Processor 203 processes the received baseband signals and invokes different functional modules to perform features in base station 201. Memory 202 stores program instructions and data 209 to control the operations of the base station. Similar configuration exists in UE 211 where antenna 231 transmits and receives RF signals. RF transceiver module 218, coupled with the antenna, receives RF signals from the antenna, converts them to baseband signals and sends them to processor 213. The RF transceiver 218 also converts received baseband signals from the processor, converts them to RF signals, and sends out to antenna 231. Processor 213 processes the received baseband signals and invokes different functional modules to perform features in UE 211. Memory 212 stores program instructions and data 219 to control the operations of the UE.

Base station 201 and UE 211 also include several functional modules and circuits to carry out some embodiments of the present invention. The different functional modules and circuits can be configured and implemented by software, firmware, hardware, or any combination thereof. The function modules and circuits, when executed by the processors 203 and 213 (e.g., via executing program codes 209 and 219), for example, allow base station 201 to schedule (via scheduler 204), encode (via encoder 205), mapping (via mapping module 206), and transmit control information and data (via control module 207) to UE 211, and allow UE 211 to receive, de-mapping (via de-mapper 216), and decode (via decoder 215) the control information and data (via control module 217) accordingly with interference cancellation capability. In one example, base station 201 provides configuration information that include parameters related to data transmission from neighboring cells to UE 211. Upon receiving the related parameters via configuration circuit 241, UE 211 is then able to estimate the interference channel via channel estimation circuit 242 and then perform interference cancellation via interference cancellation circuit 214 to cancel/suppress the data transmission from the neighboring cells accordingly.

Resource Allocation of PDSCH

Figure 3:
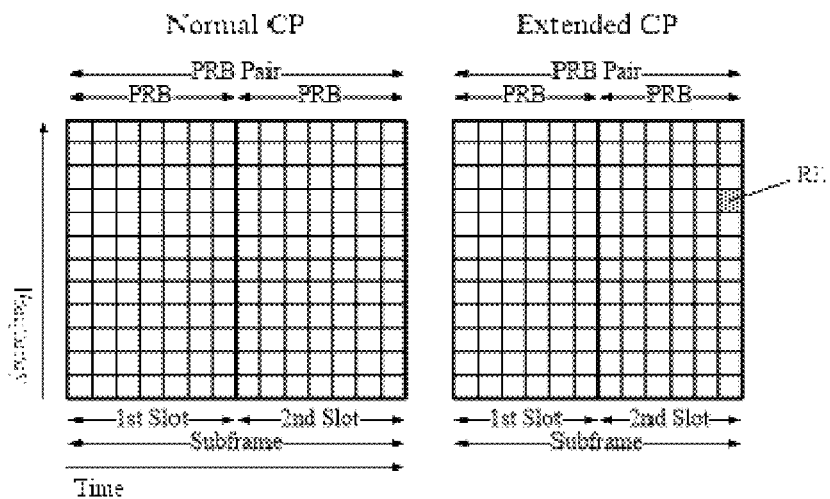
FIG. 3 illustrates physical resource blocks (PRBs) and resource allocation in LTE.

FIG. 3 illustrates physical resource blocks (PRBs) and resource allocation in 3GPP LTE. In a 3GPP LTE system based on OFDMA downlink, the radio resource is partitioned into subframes in the time domain. Each subframe is comprised of two slots, and each slot has seven OFDMA symbols in the case of normal Cyclic Prefix (CP), or six OFDMA symbols in the case of extended CP. Each OFDMA symbol further consists of a number of OFDMA subcarriers in the frequency domain depending on the system bandwidth. The basic unit of the resource grid is called a Resource Element (RE), which spans an OFDMA subcarrier in frequency domain over one OFDMA symbol in time domain. Each RE carries a data symbol from the QPSK/16QAM/64QAM modulation constellation. Resource elements are grouped into resource blocks, where each resource block (RB) consists of 12 consecutive subcarriers in one slot, which constitutes 84 REs in normal CP and 72 REs in extended CP. The minimal granularity of resource allocation in LTE is a PRB. PRBs are indexed sequentially in frequency domain.

Since the base station may allocate in PDSCH a contiguous or non-contiguous set of PRBs to a user equipment or UE, a virtual RB (VRB) is defined to allow more efficient indexing in resource allocation. A VRB of localized type (LVRB) is mapped directly to a PRB with the same indexing. When a VRB index is assigned to a UE, both PRBs locating in the same frequency location in the first and second slots of a subframe are allocated. On the other hand, a VRB of distributed type (DVRB) maps to two PRBs at different frequency locations in the two slots, according to system bandwidth and a value $N_{gap}$.

Figure 4:
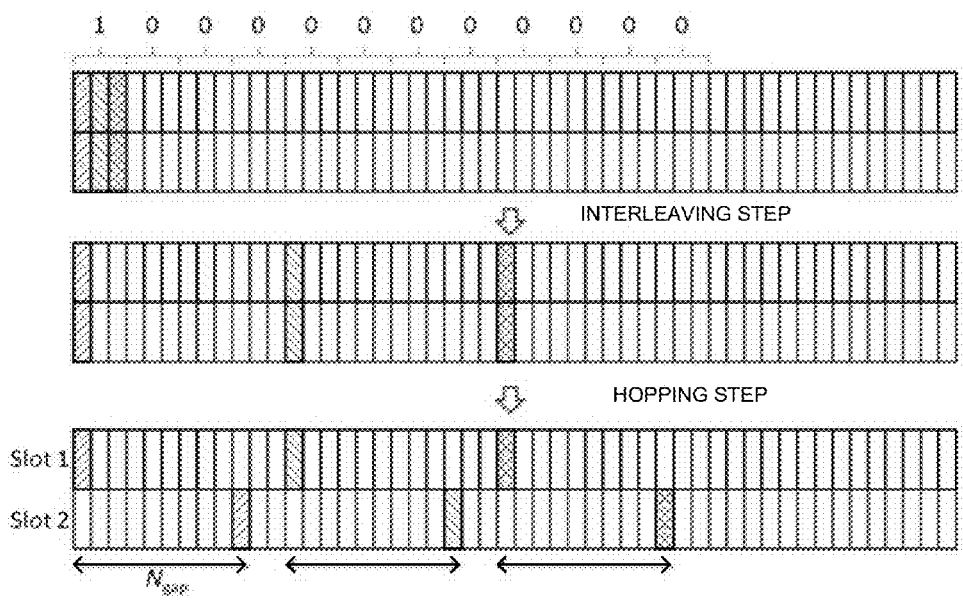
FIG. 4 illustrates mapping from virtual resource block to physical resource block for DVRB.

FIG. 4 illustrates mapping from virtual resource block to physical resource block for DVRB. Conceptually the mapping from VRB to PRB for two slots consists of a first interleaving step and a second hopping step, as illustrated in FIG. 4. RB pair interleaving is first performed for the mapping from VRB to PRB, for the first slot in one subframe. This interleaving rule is uniquely determined by the value of system bandwidth. Then a second step is applied to determine the exact location of the physical resource-block for the second slot by additionally hopping the PRB-index by $N_{gap}$. For the case with bandwidth less than 10 MHz, the value of $N_{gap}$ is uniquely determined by bandwidth. If the bandwidth is larger than or equal to 10 MHz, $N_{gap}$ will have two candidate values and the selection is signaled dynamically on the scheduling assignment.

In LTE, the resource allocation (RA) is signaled via a control channel called PDCCH (Physical Downlink Control Channel). A UE needs to decode PDCCH in order to demodulate PDSCH to decode the TB on a subframe-by-subframe basis. However, for the interference PDSCH, it is impractical for the victim UE to decode the interference PDCCH due to complexity and the fact that interference PDCCH targets at a different UE than the victim UE. Therefore, without the RA information of the interference PDSCH, a UE must estimate the characteristics of the interference on a PRB level (for DVRB) or a PRB pair level (for LVRB).

PDSCH Signal Structure

Figure 5:
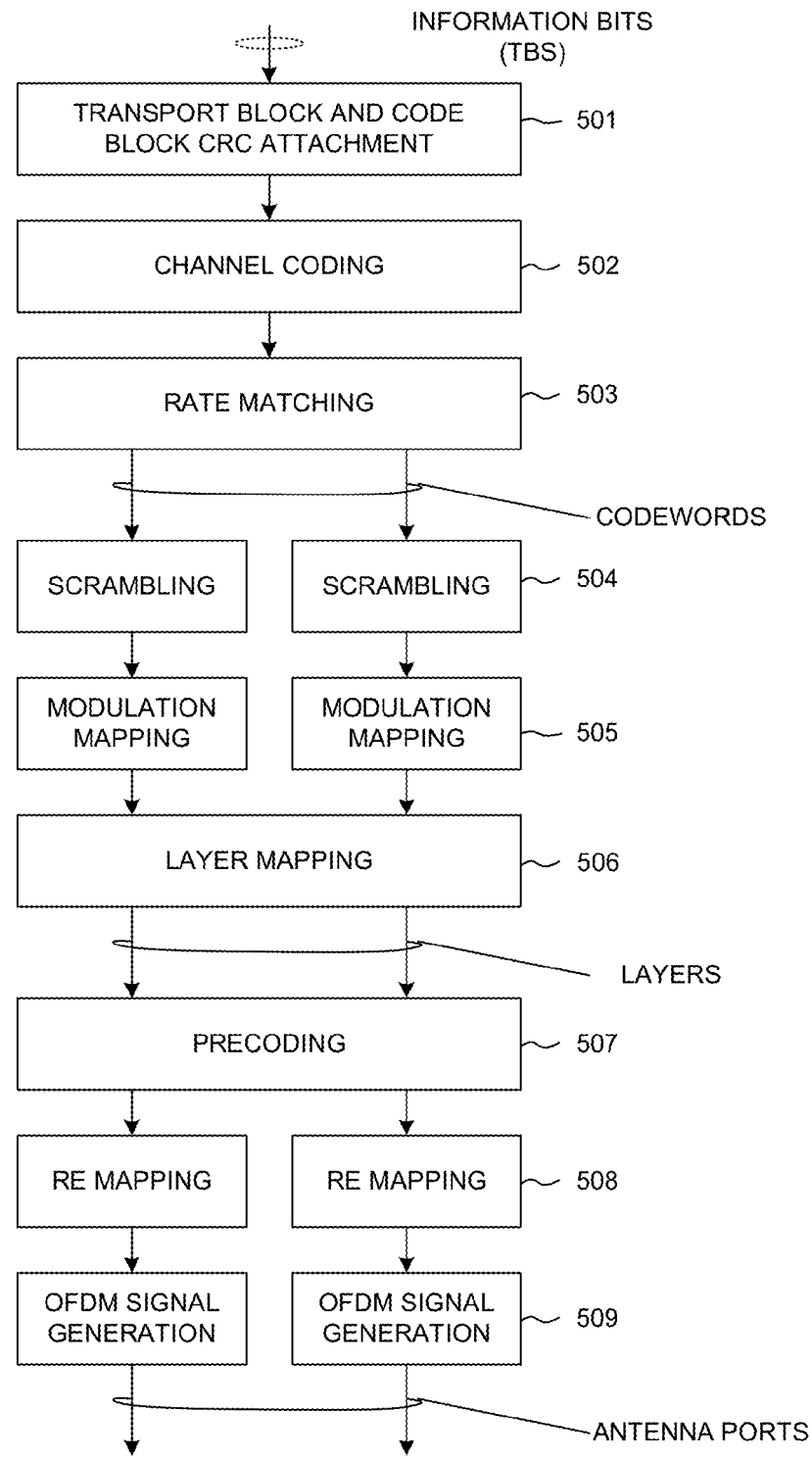
FIG. 5 illustrates functional blocks in a communication system that maps information bits of a transport block to codewords and then maps to baseband signals for transmission.

FIG. 5 illustrates functional blocks of a transmitting device in a communication system that map information bits of a transport block (TB) to codewords and then map to baseband signals for transmission. In step 501, the information bits are arranged into transport blocks (TBs) and attached with CRC. In addition, the TBs are segmented into code blocks and attached with CRC. In step 502, channel coding (forward error correction such as Turbo coding) is performed with certain code rate. In step 503, rate matching is performed, which creates an output with a desired code rate, and where the TBs are mapped into codewords. In step 504, the codewords are scrambled based on predefined scrambling rule (e.g., scramble with a corresponding Radio Network Temporary Identifier (RNTI) of the UE). In step 505, modulation mapping is performed, where the codewords are modulated based on various modulation orders (e.g., QPSK, QAM) to create complex-valued modulation symbols. In step 506, layer mapping is performed, where the complex-valued symbols are mapped onto different MIMO layers depending on the number of transmit antenna used. In step 507, precoding is performed with certain precoding matrix index (PMI) for each antenna port. In step 508, the complex-valued symbols for each antenna are mapped onto corresponding resource elements (REs) of physical resource blocks (PRBs). Finally, in step 509, OFDM signals are generated for baseband signal transmission via antenna ports.

The mapping rules in these functional blocks should be known for a receiving device to receive the transport blocks. A UE receives information-bearing signal propagating though wire channel or wireless channel and processes it to recover the transport block. For the UE to receive TBs carried by PDSCH, it first needs to know the DCI carried by PDCCH associated with these transport blocks. The DCI indicates the rules that map the information bits of each TB to the modulated symbols carried on PDSCH, the RB-allocation for the encoded and modulated symbols of the transport blocks, information related to the reference signals used for channel estimation, and power control commands. UE decodes the TBs based on received control information and the configured parameters provided by network.

In addition, several transmission formats are allowed for PDSCH in LTE. Each transmission format is referred to as a "transmission mode" (TM) that is mainly characterized by the different precoding processing and the number of layers (i.e., rank) associated with precoding. TM of the PDSCH is configured by eNodeB via high-layer messages, but precoding and rank are dynamically signaled in PDCCH. Again, it is impractical for a victim UE to decode the interference PDCCH due to complexity and the fact that interference PDCCH targets at a different UE than the victim UE.

Reference Signals

To allow a UE to demodulate PDSCH, a UE needs to derive the effective channel corresponding to the PDSCH. LTE defines two types of reference signals (RS) for that purpose. Cell-specific reference signals (CRS) are utilized by UEs for the demodulation of control/data channels in non-precoded or codebook-based precoded transmission modes, radio link monitoring and measurements of channel state information (CSI) feedback. All UEs in the serving cell can use CRS to estimate the channel associated with 1 or 2 or 4 antenna ports of the serving eNB. UE-specific Demodulation RS (DM-RS) are utilized by UEs for the demodulation of control/data channels in non-codebook-based precoded transmission modes. DMRS are used by a specific UE because they are transmitted by the same precoding as that applied to data REs, and thus can be used to derive the effective channel. Note that unlike CRS that are always present regardless of the presence of PDSCH or not, DMRS are not transmitted in PRBs when there is no PDSCH in that PRB.

Figure 6:
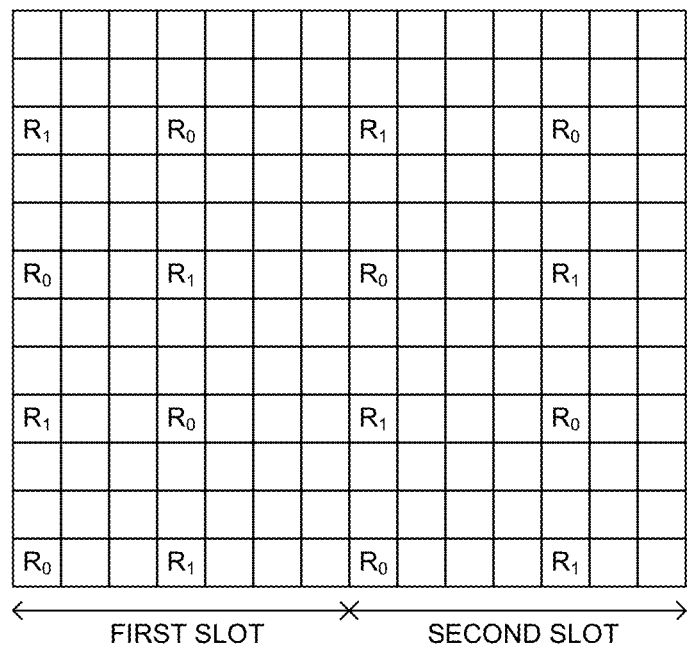
FIG. 6 illustrates cell-specific reference signals in a PRB pair for two antenna ports.

FIG. 6 illustrates one example of cell-specific reference signal in a PRB pair for 2 antenna ports (denoted as R0 and R1). After obtaining the channel corresponding to each antenna ports from relevant CRS, the UE can apply the dynamically signaled precoding information called Precoding Matrix Index (PMI) to derive the effective channel associated with the precoded PDSCH transmission (one channel for each layer or rank).

LTE defines TMs in association with CRS or DMRS as follows: 1) TM 1: single antenna port (i.e., single CRS port); 2) TM2/3: transmission diversity (TxD) for rank-1 and large-delay CDD for rank-2 (2 or 4 CRS ports); 3) TM4/6: rank-1 or 2 precoding based on 2/4 CRS ports; and 4) TM8/9/10: rank-1 or 2 precoding based on DMRS ports. Even though TM is configured via high layer messages to each UE specifically, the PMI and RI (rank indicator) for TM4/6 are dynamically signaled in PDCCH.

Interference Cancellation Method

To cancel the interference PDSCH from a neighboring cell, the UE needs the knowledge of the interference channel corresponding to the interference PDSCH. Once the interference channel is estimated, the UE can apply different interference cancellation methods. For example, applying a linear MMSE receiver to linearly suppress the interference on each data RE. If the UE can further detect the modulation order of the PDSCH out of the three constellations (i.e., QPSK, 16QAM, 64QAM), it may estimate the interference symbol and then try to successively cancel the interference signal by reconstructing the signal from the estimated channel and the estimated symbols (i.e., symbol-level IC). Alternatively, the UE may jointly detect the desired and interference PDSCH via, for example, a Maximum Likelihood (ML) type of receiver processing. Furthermore, if the exact resource allocation (RA) of interference PDSCH is known, and along with coding information, the entire PDSCH may be more reliably reconstructed for IC.

Obtaining channel state information relies on the received reference signals and may need the aid of signaling to know the used precoder. For PDSCH transmission, the transmission mode could be either CRS-based or DMRS-based. For CRS-based transmission mode, the precoder used by PDSCH is signaled to receiver through control channel. The precoder information cannot be extracted from the received cell-specific reference signals. The UE needs to know the PMI that is to be applied on the channel estimated from the neighboring cell's CRS. In addition, the UE needs to first detect the TM and the presence or absence of interference PDSCH in each PRB. On the other hand, for DMRS-based transmission mode, precoding is also applied on DMRS. Receiver directly estimates the compound channel formed by propagation channel and the used precoding vector/matrix for further processing. The UE can estimate the interference channel and detect its presence directly from DMRS as long as the DMRS sequence is known.

While the victim receiver is supposed to know the complete control information for its own PDSCH signal through RRC and PDCCH from its serving eNB, such information associated with interference signal are generally unknown to the victim receiver. It is impractical for a UE to detect interference PDCCH to obtain all the transmission parameters corresponding to the interference PDSCH. An efficient way to signal information about the interference signal would reduce the receiver's complexity to estimate/detect interference information and help the receiver to provide better performance resulting from IC gain.

In the "Network Assisted Interference Cancellation and Suppression" (NAICS) study item, various parameter candidates helpful for interference cancellation were identified. For example, parameters that are higher-layer configured per the current specifications (e.g., transmission mode, cell ID, MBSFN subframes, CRS antenna ports, $P_A$, $P_B$); parameters that are dynamically signaled per the current specifications (e.g., CFI, PMI, RI, MCS, resource allocation, DMRS ports, $n_{ID}^{DMRS}$ used in TM10); and other deployment related parameters (e.g., synchronization, CP, subframe/slot alignment). Although it is possible to let receiver detect or estimate these parameters associated with the interfering signal without any aid of signaling, the complexity cost could be very huge to estimate them. Furthermore, since interference characteristic may change for every PRB/subframe, dynamic signaling all the parameters is not feasible.

Higher Layer Signaling

In LTE Rel-11, it is already made possible to signal, via radio resource control (RRC) message, a list of neighboring cell IDs, CRS ports, and MBSFN subframe patterns (since CRS is only present on the first symbol of any MBSFN subframe).

In one embodiment, a UE receives the following information about a neighboring cell: 1) Whether the cell can be considered as synchronized with the serving cell (including slot alignment); 2) the CP length; and 3) the System bandwidth. Once the UE knows a synchronized deployment, the UE can easily decide whether to apply IC receiver or not. System bandwidth information will be useful to determine the CRS to be used and some other RA-related knowledge discussed later. Even though the above information can be obtained once the UE can successfully process the PSS/SSS to learn about synchronization status and CP length, and process PBCH to learn about the system bandwidth, it is noted that the interference PSS/SSS and PBCH may be subject to stronger desired cell transmission and thus prone to detection error.

In another embodiment, a UE obtains, from a serving cell via higher-layer messages, configuration information of a data transmission from a neighboring cell, wherein the configuration information includes a specific TM or a small subset of TMs that a neighboring cell uses for all the PDSCHs. As an example, the serving eNB sends, in its RRC configuration message, a list of neighboring cell IDs and TM(s) to be used. Note that even a specific TM is indicated, current LTE allows a "fallback" override of the TM to a default TxD transmission format. Typically, this happens when an eNB finds previous PDSCH are not reliably received. Once the TM or TM subset is known, the UE can not only reduce the complexity but also increase the robustness of channel estimation and presence/absence detection. For example, the UE only need to detect if DMRS is present or not if it knows that the interference PDSCH can only be TM9 or a "fallback" to TxD. The eNB can further indicate no fallback if it wishes.

Another example is that TM also implies the rank of transmission, such as TM2 is the rank-1 special case of TM3 and TM6 is the rank-1 special case of TM4. Hence, such TM signaling removes any need of RI detection and associated error. In the case of DMRS-based TM8/9/10, the antenna port to be occupied by interference PDSCH may also be notified to the UE via higher layer messages, and similarly for the parameter $n_{scid}$ that is required to generate the DMRS sequence. In TM10, the so-called "virtual cell ID", which is the parameter $n_{ID}^{DMRS,i}$ (for i=0 or 1) used for generating the DMRS sequence can also be informed to the UE.

Interference Channel Estimation

A victim receiver may estimate the inference channel with the aid of known pilot signals from co-channel interference. For example, if the signaled information is for the generation of DMRS pattern of interference, such information of reference signal is beneficial for (1) detection the existence of interference on each RB; and (2) estimation for the channel of interference. In this DMRS-based case, as already mentioned, the precoding information of inference is not necessary because DMRS is precoded by the same precoder applied on interference's PDSCH. If the signaled information is for the generation of CRS pattern of interference, it is helpful to estimate the interference channel, but not for the precoding information of interference. In this case, obtaining the precoding information may rely on further signaling or receiver's capability to detect it.

Figure 7:
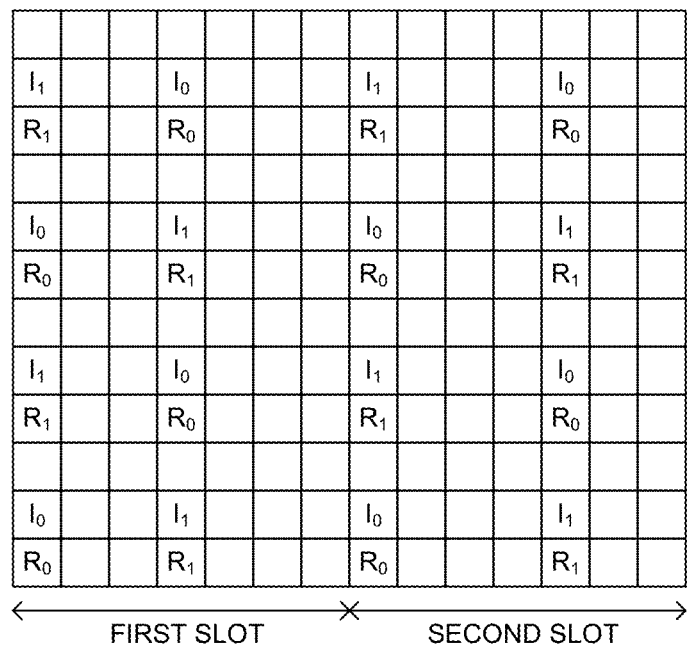
FIG. 7 illustrates channel estimation of an interference channel.

FIG. 7 illustrate channel estimation for an interference channel. Interference channel estimation is straightforward from DMRS, but not so in CRS-based TMs. Suppose $R_0$ and $R_1$ are the RE-positions for CRS port 0 and port 1 associated with the serving cell and $I_0$ and $I_1$ are the RE-positions for CRS port 0 and port 1 associated with a neighboring cell. For the victim UE, the CRS REs marked by $R_0$ and $R_1$ suffer from precoded interference from the data channel transmitted by neighboring cells. Since a UE cannot use $I_0$ and $I_1$ to detect the presence/absence or the PMI of the interference signal, the UE must perform the interference detection at $R_0$ and $R_1$ (i.e., CRS REs) or at the data REs of the serving cell, for each PRB in one slot. If the UE further knows the configuration information of the basic resource-allocation unit of the neighboring cell, as will be clarified later, it can collect more observations at those REs across more PRBs to make the interference detection more reliable.

On the data REs, the received signal is the superposition of contributions from both the unknown desired symbol and the interference PDSCH symbol. On the other hand, at the CRS REs of the serving cell, the signal corresponding to the serving cell can be estimated and subtracted to get the interference signal for later detection of the PMI used by the interference PDSCH. There are several methods to detect the PMI used by the neighboring cell. One approach is by comparing the observed LLR under different hypotheses of PMI candidates at these CRS REs. Another approach is by comparing the empirical covariance matrix of the interference signal with that of the asymptotic one under different PMI hypotheses. Since the precoder used by neighboring cell usually is the same over more than one PRB, one key to improve the detection performance is to know the location of resource-blocks where the same transmission parameters are applied by the neighboring cell.

Resource Allocation (RA) Information

From the above discussion, it is noted that RA information can be very helpful for estimating the interference channel and for canceling the interference PDSCH transmission. In LTE, the PDCCH contains all the RA information including DVRB or LVRB flag and the number of PRB allocated, PMI/RI for TM4&6, and modulation and coding scheme. Therefore, the UE must detect those parameters on a PRB basis without the RA information. Note that there are only 4 CRS in each PRB (8 in a PRB pair) for each CRS port, but a UE can use all the CRS in the entire system bandwidth. In CRS-based TMs, the UE must then detect those parameters from the data REs or CRS REs within a PRB. In DMRS-based TMs, the UE can only use the DMRS in each PRB pair (i.e., 12 DMRS). To increase the robustness of detection, some RA information, if made available to the UE, can significantly improve the interference detection and cancelation performance.

In one embodiment, the UE obtained the following configuration related to resource allocation of the interference PDSCH: an indication of resource allocation type. In LTE, the most scheduling-flexible approach to signal resource-allocation is to signal the bitmap with a size the same as the number of resource blocks within the cell bandwidth. However, this way may result in significant overhead especially when the cell-bandwidth is large. To reduce overhead, grouping of contiguous resource blocks is supported in DCI format 1, 2, 2A, 2B, 2C, and 2D for type-0 resource allocation. A serving cell only needs to signal the bitmap of resource-block groups (RBGs) with reduced signaling overhead instead of signaling for each resource block. In current LTE specifications, DCI format 1 is used for TM1, TM2, and TM7; DCI formats 2 and 2A are used for two CRS-based TMs: TM4 and TM3; DCI formats 2B, 2C, and 2D are used for the following three DMRS-based TMs: TM8, TM9, and TM10.

Among the current standardized DCI formats, for DCI format 1 (for TM1, TM2, and TM7), DCI format 2 (for TM4), 2A (for TM3), 2B (for TM8), 2C (for TM9), and 2D (for TM10), there is a one-bit field to be signaled from serving cell so that a UE can know either type-0 or type-1 RB-allocation is used. If type-1 RB-allocation is used, the resource allocation is per-RB based with additional constraints. If the UE learned that the neighboring cell is restricted to type 0, it can assume that transmission parameters including RI, PMI, MOD, and the presence/absence of the interference are the same for the physical resource-block "pair" in two slots in one subframe. Such an assumption can improve the detection reliability of those transmission parameters used by a neighboring cell. If not so indicated, a UE must do per-RB based detection for transmission parameters of interference.

RBG-based signaling implies that if one of the resource blocks within a RBG is scheduled, the rest of resource blocks within the same RBG must be also assigned to the same user. In LTE, the RI and MOD must be the same for all of the resource-blocks assigned to a UE. For CRS-based TMs except for TM2 and TM3, the used precoder must be same for all RBs within one RBG. Thus, a UE may combine its observations on multiple RBs with same transmission parameters of interference to detect RI/PMI/MOD instead of applying per-RB-based detection.

In another embodiment, the UE can obtain the configuration information of PRB bundling as the basic unit for resource allocation. PRB bundling is already supported in DMRS-based TM9 when the UE is also requested to report PMI/RI. However, such bundling operation can be made cell-specific to improve the parameter detection of interference. In that case, a similar higher-layer RRC message can be used to allow the UE to always use all the DMRS in the basic unit for detection. A similar method is to enforce subband based resource allocation when the allocation is constrained to be a subband. The basic unit for RA may be directly configured, instead of deriving from the information of TMs and system bandwidth. It can be the RBG size or the subband size for CSI feedback already defined in current LTE system.

In yet another embodiment, LVRB/DVRB resource allocation is also supported in LTE to provide frequency diversity. A field called LVRB/DVRB assignment flag is defined in DCI format 1A (all TMs), 1B (TM6) and 1D (TM5, MU-MIMO). One bit is used for this field to signal LVRB/DVRB. In case of DVRB and when the cell bandwidth is greater than or equal to 50 PRB, another 1-bit is used to indicate either $N_{gap1}$ or $N_{gap2}$ is used.

For LVRB, there is no problem to let a victim UE to assume the RI/PMI/MOD is the same for the physical resource-block pair in two slots in one subframe. For DRVB-mode, the index of physical resource-block for two slots corresponding to the same VRB index is split by a gap value, $N_{gap}$. It is possible in theory to detect DVRB versus LVRB by, for example, checking if some transmission parameters of interference, e.g., power, MOD or PMI, are invariant across contiguous multiple physical resource blocks. However, the reliability is doubtful considering that DVRB is applied in a UE specific and dynamic manner. It is more feasible when there is a higher-layer message to indicate that DVRB is applied in a cell.

In DVRB case, a UE still needs two more parameters to exactly know the physical resource-block pair occupied by the interference PDSCH: the bandwidth size and the gap value $N_{gap}$. As discussed earlier, the mapping from VRB to PRB for two slots consists of one interleaving step and one hopping step. After knowing the exact interleaving rule and hopping rule of the neighboring cell, the UE can then use a both PRB in the two slots for interference channel estimation for example.

Currently in LTE, there are eight values (denoted as $\rho_A$) allowed for the ratio of PDSCH EPRE (Energy Per Resource Element) to CRS EPRE, for data REs in the OFDM symbols that do not contain CRS. There are also 4 different $\rho_B/\rho_A$ values allowed where $\rho_3$ denotes the PDSCH EPRE to CRS EPRE ratio for data REs on OFDM symbols that contain CRS. Both $\rho_A$ and $\rho_B/\rho_A$ are signaled as a UE-specific value, which means it can change depending on the UE being scheduled. In one embodiment, the UE can be notified by its serving cell a subset of $\rho_A$ and $\rho_B/\rho_A$ that may be applied in a cell specific fashion. As a result, the UE can detect these setting more reliably.

Interference Cancellation Example

Figure 8:
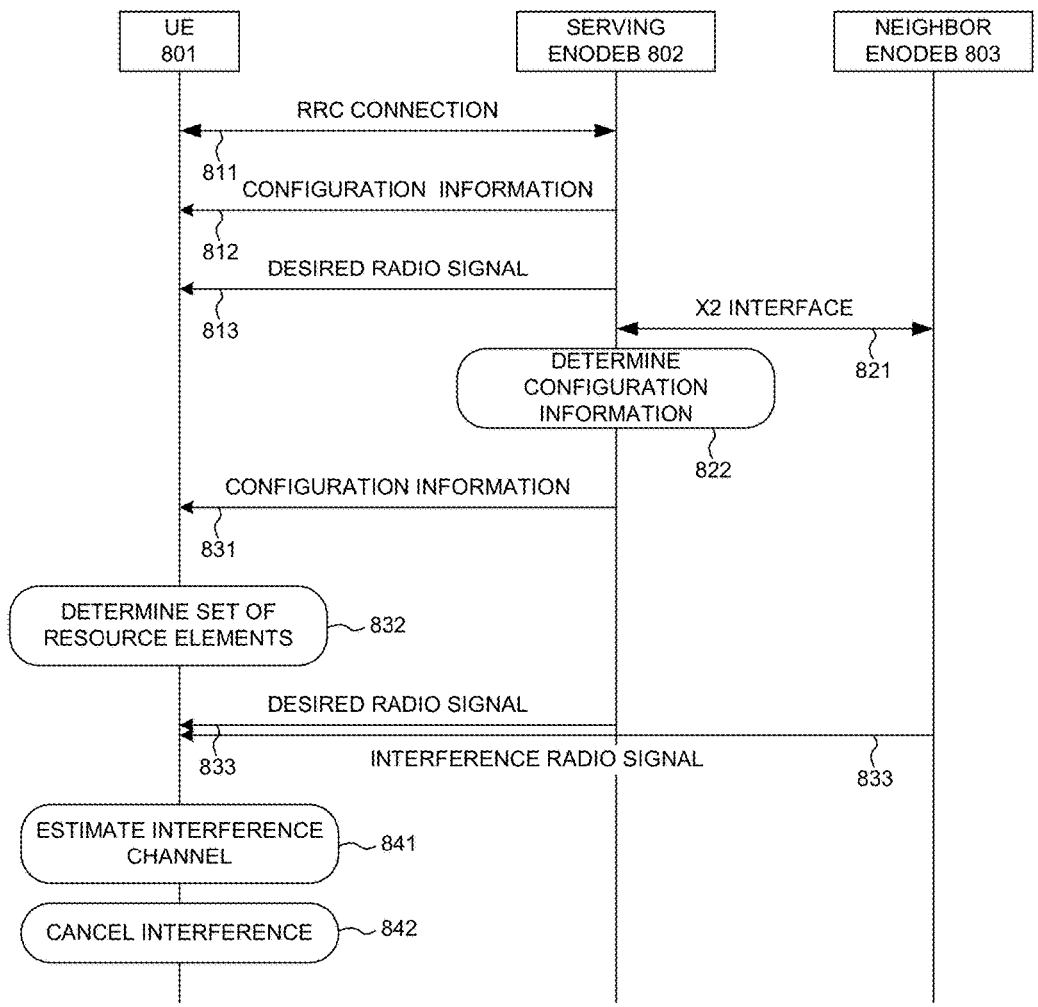
FIG. 8 illustrates one embodiment of cancelling data transmission from a neighbor cell.

FIG. 8 illustrates a method of cancelling data transmission from a neighbor cell in a mobile communication network comprising a UE 801, a serving base station eNB 802, and a neighboring base station eNB 803. In step 811, UE 801 establishes a radio resource control RRC connection with its serving eNB 802. In step 812, UE 801 receives configuration information via RRC signaling. The configuration information may include semi-persistent information such as slot alignment, CP length, system bandwidth, transmission mode (TM), cell ID, MBSFN subframes, CRS antenna ports, $P_A$, $P_B$, and other parameters related to desired radio signals to be transmitted to UE 801. In step 813, UE 801 receives desired radio signals from eNB 802. UE 801 is able to decode the desired radio signal based on additional PDSCH configuration that is dynamically signaled via PDCCH.

In addition to the desired radio signals, however, UE 801 may also receive interfering radio signals from other neighboring cells. In the example of FIG. 8, neighboring base stations communicate with each other via X2 interface or via proprietary signaling across eNBs of the same vendors. For example, eNB 802 may receive certain configuration information from eNB 803, such as resource allocation used by eNB 803 for its data transmission. Exchange of configuration information between eNB 802 and eNB 803 could be via X2 interface 821. In step 822, eNB 802 determines a second configuration information related to data transmission from eNB 803, including slot alignment, CP length, system bandwidth, transmission mode (TM), cell ID, MBSFN subframes, CRS antenna ports, $P_A$, $P_B$, etc. of the data transmission from eNB 803.

In step 831, eNB 802 sends the second configuration information to UE 801 via RRC signaling. The second information may include semi-persistent information such as transmission mode (TM), cell ID, MBSFN subframes, CRS antenna ports, $P_A$, $P_B$, and other parameters related to interfering radio signals to be transmitted to UE 801 from eNB 803. In step 832, UE 801 determines a set of data resource elements based on the second configuration information. In one example, the second configuration information indicates that eNB 803 may adopt DMRS-based transmission modes, e.g., TM8 and TM9. Since DMRS are not transmitted in PRBs when there is no PDSCH in that PRB, UE 801 may detect the presence of DRMS-based PDSCH interference from eNB 803 by detecting the presence of DMRS from eNB 803 at the data resource elements corresponding to port 7 and port 8. In another example, the second configuration information may include resource allocation type and basic resource allocation unit, which allows UE to assume the same transmit parameters, e.g., precoder or modulation order, are used at the set of data resource elements within the basic resource allocation unit consisting of multiple PRBs.

In step 833, UE 801 receives both desired radio signal from serving eNB 802 and interfering radio signal from neighboring eNB 803 on the set of data resource elements. In step 841, UE 801 estimates the interference channel based on the received radio signals on the set of data resource elements. In one example, UE 801 first estimates the desired signal corresponding to a reference signal transmitted from the serving cell, and then subtracts from the received signals the estimated desired signal and thereby estimating the interference channel. In one example, the interference signal is obtained for later detection of the PMI used by eNB 803. Note that the PMI detection performance can be improved when UE 801 knows the location of the resource blocks where the same transmission parameters are used by eNB 803. In step 842, upon estimating the interference channel, UE 801 is able to cancel the interference signal of the data transmission from neighboring eNB 803.

Figure 9:
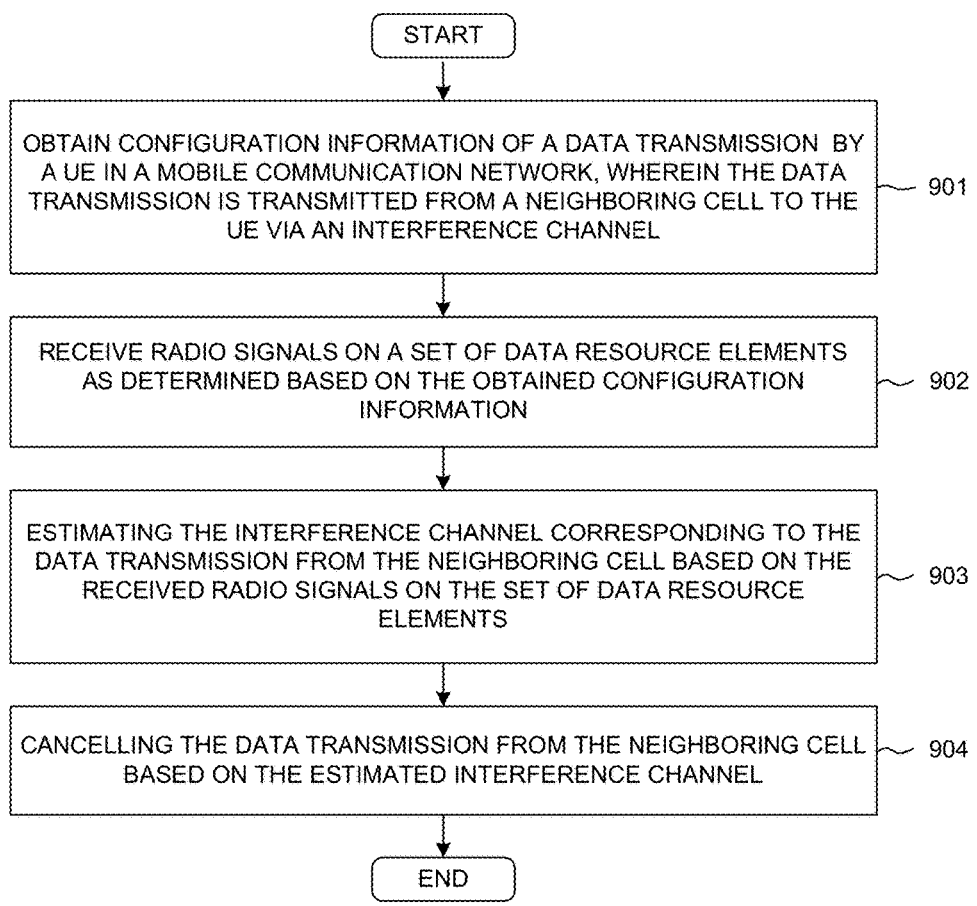
FIG. 9 is a flow chart of a method of interference cancellation from UE perspective in accordance with one novel aspect.

FIG. 9 is a flow chart of a method of interference cancellation from UE perspective in accordance with one novel aspect. In step 901, a UE obtains configuration information of a data transmission in a mobile communication network. The data transmission is transmitted from a neighboring cell to the UE via an interference channel. The UE may obtain such configuration information via high layer signaling from a serving cell. In step 902, the UE receives radio signals on a set of data resource elements as determined based on the obtained configuration information. In step 903, the UE estimates the interference channel corresponding to the data transmission from the neighboring cell based on the received radio signals on the set of data resource elements. In step 904, the UE cancels the data transmission from the neighboring cell based on the estimated interference channel. In one example, the UE cancels the data transmission based on the obtained configuration information, e.g., detecting PMI of the interference signal based on resource allocation information and cancel the data transmission from the neighboring cell accordingly.

Figure 10:
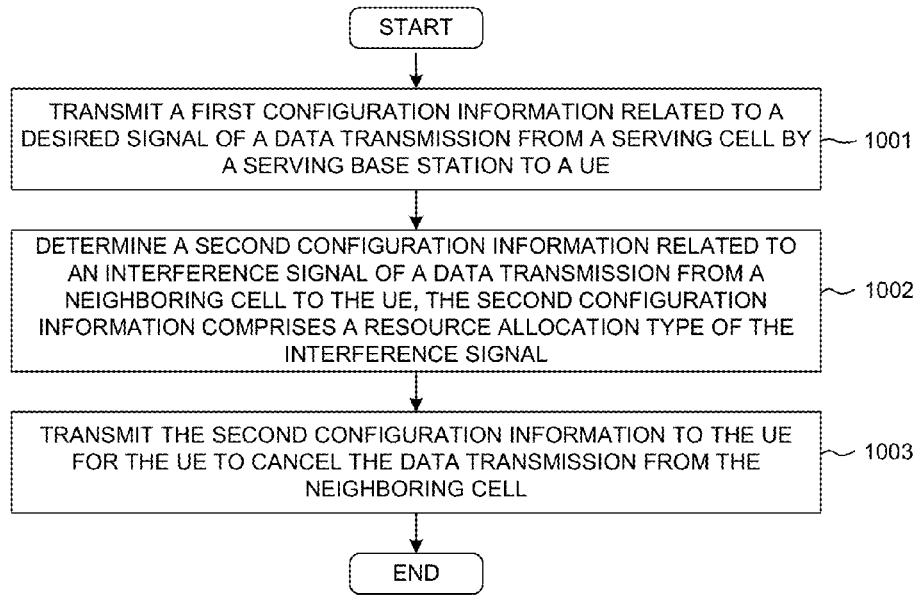
FIG. 10 is a flow chart of one embodiment of a method of interference cancellation from eNB perspective in accordance with one novel aspect.

FIG. 10 is a flow chart of one embodiment of a method of interference cancellation from eNB perspective in accordance with one novel aspect. In step 1001, a serving base station transmits a first configuration information to a UE, the first configuration information is related to a desired signal of a data transmission from a serving cell to the UE. In step 1002, the serving base station determines a second configuration information related to an interference signal of a data transmission from a neighboring cell to the UE. The second configuration information comprises a resource allocation type of the interference signal. In step 1003, the serving base station transmits the second configuration information to the UE such that the UE can cancel the data transmission from the neighboring cell.

Figure 11:
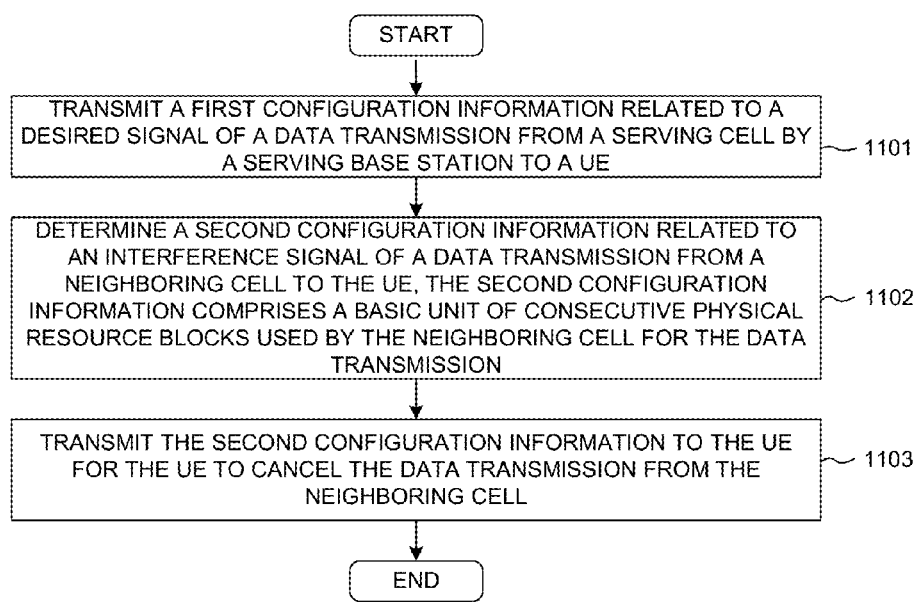
FIG. 11 is a flow chart of another embodiment of a method of interference cancellation from eNB perspective in accordance with one novel aspect.

FIG. 11 is a flow chart of another embodiment of a method of interference cancellation from eNB perspective in accordance with one novel aspect. In step 1001, a serving base station transmits a first configuration information to a UE, the first configuration information is related to a desired signal of a data transmission from a serving cell to the UE. In step 1002, the serving base station determines a second configuration information related to an interference signal of a data transmission from a neighboring cell to the UE. The second configuration information comprises a basic resource allocation unit of the interference signal. In step 1003, the serving base station transmits the second configuration information to the UE such that the UE can cancel the data transmission from the neighboring cell.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   obtaining configuration information of a data transmission by a user equipment (UE) in a mobile communication network, wherein the data transmission is transmitted from a neighboring cell to the UE via an interference channel, wherein the configuration information includes a specific transmission mode or a subset of transmission modes used by the neighboring cell for the data transmission;
   receiving radio signals on a set of resource elements (REs);
   estimating the interference channel corresponding to the data transmission from the neighboring cell based on the received radio signals on the set of resource elements; and
   cancelling/suppressing the data transmission from the neighboring cell based on the estimated interference channel.

2. The method of claim 1, wherein the configuration information includes a resource allocation type used by the neighboring cell for the data transmission.

3. The method of claim 2, wherein the resource allocation type includes a type 0 or type 1 of LTE downlink resource allocation.

4. A user equipment (UE), comprising:
   a configuration circuit that obtains configuration information of a data transmission by a user equipment (UE) in a mobile communication network, wherein the data transmission is transmitted from a neighboring cell to the UE via an interference channel, wherein the configuration information includes a specific transmission mode or a subset of transmission modes used by the neighboring cell for the data transmission;
   a receiver that receives radio signals on a set of resource elements (REs);
   a channel estimation circuit that estimates the interference channel corresponding to the data transmission from the neighboring cell based on the received radio signals on the set of resource elements; and
   an interference cancellation circuit that cancels and/or suppresses the data transmission from the neighboring cell based on the estimated interference channel.

5. The UE of claim 4, wherein the configuration information includes a resource allocation type used by the neighboring cell for the data transmission.

6. The UE of claim 5, wherein the resource allocation type includes a type 0 or type 1 of LTE downlink resource allocation.

* * * * *